US00RE35554E

United States Patent [19]

Pompei et al.

[11] E Patent Number: Re. 35,554

[45] Reissued Date of Patent: Jul. 8, 1997

[54] RADIATION DETECTOR WITH TEMPERATURE DISPLAY

[75] Inventors: Francesco Pompei, Boston; Michael W. Burke, Natick, both of Mass.

[73] Assignee: Exergen Corporation, Watertown

[21] Appl. No.: 222,324

[22] Filed: Apr. 4, 1994

Related U.S. Patent Documents

Reissue of:

[64] Patent No.: 4,874,253
Issued: Oct. 17, 1989
Appl. No.: 32,067
Filed: Mar. 27, 1987

U.S. Applications:

[63] Continuation of Ser. No. 778,046, Oct. 16, 1991, abandoned.

[51] Int. Cl.[6] ..... G01J 5/26

[52] U.S. Cl. ..... 374/121; 374/128

[58] Field of Search ..... 374/121, 124, 374/128, 129, 130, 133; 340/586, 600

[56] References Cited

U.S. PATENT DOCUMENTS

| | | | |
|---|---|---|---|
| 3,282,106 | 11/1966 | Barnes | 73/355 |
| 3,444,739 | 5/1969 | Treharne | 374/124 |
| 3,777,568 | 12/1973 | Risgin et al. | 374/128 |
| 4,013,260 | 3/1977 | McClatchie et al. | 250/343 |
| 4,081,678 | 3/1978 | Macall | 250/330 |
| 4,317,998 | 3/1982 | Dore | 250/357 |
| 4,321,594 | 3/1982 | Galvin et al. | 340/567 |
| 4,343,182 | 8/1982 | Pompei | 374/31 |
| 4,372,690 | 2/1983 | Berman et al. | 374/29 |
| 4,420,265 | 12/1983 | Everest et al. | 374/133 |
| 4,456,390 | 6/1984 | Junkert et al. | 374/128 |
| 4,481,417 | 11/1984 | Inglee | 250/338.1 |
| 4,566,808 | 1/1986 | Pompei et al. | 374/124 |
| 4,596,932 | 6/1986 | Buffa et al. | 250/374 |
| 4,636,091 | 1/1987 | Pompei et al. | 374/124 |
| 4,730,940 | 3/1988 | Herber et al. | 374/127 |
| 4,784,149 | 11/1988 | Berman et al. | 128/664 |

OTHER PUBLICATIONS

Raynger User's Manual, Raytek, Inc. (1983), pp. 1–17.
Microscanner E., Exergen Corporation Brochure 1985.

*Primary Examiner*—Thomas B. Will
*Assistant Examiner*—Willie Morris Worth
*Attorney, Agent, or Firm*—Hamilton, Brook, Smith & Reynolds, P.C.

[57] ABSTRACT

A radiation detector with temperature readout has a multi-colored LED display divided into segments of zero degrees to 9 degrees centigrade colored green, 10 degrees to 19 degrees centigrade in yellow, and 20 degrees to 100 degrees centigrade in red. Alternatively, two red segments are provided for ranges of 20 degrees to 64 degrees centigrade and 65 degrees centigrade and above, respectively. The radiation detector is automatically zeroed at ambient upon use and provides a readout of temperature rise above ambient throughout a scan of a subject. In one design, only one LED for each segment of the display is illuminated at a time. An audible signal is sounded at an increasing pulse frequency as the display is illuminated from the green segment to the red segment of measured temperature rise above ambient with a constant tone for temperature rises above about 20 degrees centigrade. In an alternative design a timing circuit allows the detector to self operate for a predetermined length of time. The detector sounds a 'beep' tone before automatically shutting itself off. A window made of germanium covers the radiation sensor and filters out wavelengths not of interest.

77 Claims, 4 Drawing Sheets

RADIATION DETECTOR WITH TEMPERATURE DISPLAY

Matter enclosed in heavy brackets [ ] appears in the original patent but forms no part of this reissue specification; matter printed in italics indicates the additions made by reissue.

*This application is a continuation of co-pending application Ser. No. 07/778,046 filed Oct. 16, 1991, now abandoned, which is a Reissue of Ser. No. 07/032,067, filed on Mar. 27, 1987, U.S. Pat. No. 4,874,253.*

BACKGROUND

Over time, the repeated normal use of electrical equipment causes electrical connections to become loose and weak. The increased electrical resistance of such connections can result in heating which presents a fire hazard. Insurance and utility companies have recommended guidelines that establish temperatures which indicate that corrective action should be taken. In the past, inspection of electrical equipment for such faults was unsafe, costly and/or inaccurate. Infrared inspection has been used as a fast, easy and very effective way of detecting electrical problems by the heat generated. Infrared inspection is safe as no contact is made with the electrical equipment. It is cost effective and accurate as the equipment is not shut down. Infrared inspection can also be used to detect fire from sources other than electrical equipment.

One such infrared detector is the Microscanner E manufactured by EXERGEN Corp. of Natick, MA. That detector comprises a multicolor full bar graph display which responds to a radiation sensor and provides a temperature signal of a subject above a reference temperature. The bar graph display is arranged into three segments of about zero degrees centigrade to 9 degrees centigrade, about 10 degrees to 19 degrees centigrade and about 20 degrees centigrade and greater. Each segment is of a different color. It is preferred that the segments are colored green, yellow and red respectively, indicating the recommended guidelines of insurance and utility companies for the indicated temperature rise above ambient temperature. The green segment indicates an acceptable temperature rise. The yellow segment indicates a potential problem and that reinvestigation is needed. The red segment indicates an immediate problem. The segments are illuminated from zero degrees to the indicated temperature to give a full bar indication of the amount of radiation sensed by the radiation sensor. The red segment flashes on and off when a temperature rise above 100 degrees centigrade is detected.

The display includes elements which are driven in a piecewise linear fashion. The elements are grouped together and each group is associated with a display driver. The display drivers respond to a display input indicative of the amount of radiation sensed by the radiation sensor and incrementally select display elements. Each driver responds to a single incremental change in the display input for different selections of display elements, but different drivers respond to different incremental changes for different selections of display elements. Thus, the display drivers provide a piecewise linear approximation of temperature which is a nonlinear function of the sensed heat flux.

The display provides a wide range of temperatures by each group of elements being divided into different temperature increments. Specifically, the 20 degrees centigrade and above segment of the bar graph display is divided into larger temperature increments than the 0 degrees to 9 degrees centigrade and the 10 degrees to 19 degrees centigrade segments.

The detector establishes the reference temperature by an autozero circuit. The autozero circuit initially establishes a high reference signal which results in a display signal above the zero level of the bar graph. The high reference signal is reduced until the display signal reaches the zero level of the bar graph at which point the reference signal is held. During a subsequent scan of the target, the autozero circuit sums the reference signal with a radiation signal indicative of the amount of sensed radiation. This sum provides the display signal.

DISCLOSURE OF THE INVENTION

An object of the present invention is to provide a device that is easily and quickly used by a relatively inexperienced technician to determine the heat losses and temperature rise above a reference temperature of electrical equipment and other surfaces. A further object of the invention is to provide such a device which is relatively inexpensive, portable and accurate outdoors as well as indoors.

In one design of the invention, the device with an autozero circuit is held on for about 30 seconds by a timing circuit. The timing circuit automatically turns the device off at the end of about 30 seconds and sounds a 'beep' tone to signify its turning off. The timing circuit and the autozero circuit are reset each time the user turns on the power of the detector.

The detector includes a multicolor display which responds to the sensor and provides an indication of the temperature of a subject above the reference temperature. The display shows three colored segments, green, yellow and red signifying no problem, caution and danger readings respectively, with or without numerical references. The green segment corresponds to a temperature rise above reference of about 0 degrees centigrade to 9 degrees centigrade. The yellow segment corresponds to a temperature rise of about 10 degrees to 19 degrees centigrade, and the red segment corresponds to a temperature rise of about 20 degrees centigrade and greater. In another design of the invention, as the segments are illuminated, a pulsed audible signal sounds with increasing pulse frequency from the "no problem" segment to the "danger" reading segment.

In accordance with another aspect of the invention, the autozero circuit establishes a reference signal by placing charge on a capacitor through a time controlled switch. The switch is closed by a timer upon the turning on of the device. The closed switch allows charge to be placed on the capacitor. The timer holds the switch closed just long enough to charge the capacitor to a level indicative of the temperature of the sensed reference. The timer also disenables the buzzer and display until the capacitor is charged to the level indicative of the temperature of the sensed reference. When the timer opens the switch to the capacitor, the display and buzzer are enabled and the display illuminates, signifying the autozeroing of the unit. During a subsequent scan of the subject, the autozero circuit sums the reference signal with a radiation signal indicative of the amount of sensed radiation, and this sum provides a display signal.

In another design of the invention, a low cost circuit embodies the autozero circuit, and a display of 3 LED's signifies safe, caution and danger readings. In the display only one LED at a time is illuminated. The autozero circuit is like the one described above. During a subsequent scan of the subject, the reference signal establishes by the autozero circuit is summed with the radiation signal indicative of the amount of sensed radiation. This sum drives two comparators to produce inputs to a 2 to 4 decoder which selects one of the three LED's. The second inputs to the two comparators are taken from voltage dividers which divide the reference voltage from the reference voltage generator. With low temperatures, the summed signals are less than the voltage needed to enable either comparator so only the green LED is illuminated. With higher temperatures the sum enables one comparator which causes the decoder to illuminate just the yellow LED. With even higher temperatures the sum enables both comparators causing the decoder to illuminate the red LED.

The buzzer sounds in reference to the three LED's. A slow continuous pulse frequency sounds for the temperatures sensed in the range of temperatures illuminating the green LED. The pulse frequency increases for increasing temperatures within the green LED range up through the red LED temperature range. The highest pulse frequencies sound when sensed temperatures are in the temperature range for which the red LED is illuminated with a constant tone sounding for sensed temperatures above a threshold temperature.

In another design of the invention, the display is arranged into four segments colored green, yellow, red, and a second red respectively. The green segment indicates a sensed rise in temperature of less than about 10 degrees centigrade above ambient. The yellow segment indicates a temperature rise of more than about 10 degrees centigrade and less than about 20 degrees centigrade. The first red segment indicates a temperature rise between about 20 degrees centigrade and about 65 degrees centigrade. The second red segment indicates a temperature rise above about 65 degrees centigrade. The same autozero circuit is used as in the foregoing embodiments to establish a reference signal. The sum of the reference signal and a subsequent radiation signal indicative of the amount of sensed radiation drives three comparators to produce inputs to a 3 to 8 decoder which selects one of the four LED's. The three comparators and 3 to 8 decoder operate in the same manner as the two comparators and 2 to 4 decoder in the other design where higher temperatures enable an additional comparator which in turn causes the decoder to illuminate a respective LED.

Further, a buzzer sounds in reference to the four LED's as the buzzer did in the three LED embodiment with a constant tone sounding for sensed temperatures above about 20 degrees centigrade. A switch to disenable the buzzer allows the user to scan a subject without the audible signals.

In accordance with another aspect of the invention a germanium window is used to cover the radiation sensor. The window filters out sunlight energy but allows the sensor to respond to the heat energy of the subject or of a flame, the heat energy being at a longer wavelength than the sunlight energy. This filtering ensures greater accuracy of the device.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

A radiation detector 12 comprises a boxlike housing 14. This housing has an approximate dimension of 3⅛"×5"×⅝". The flat, handheld housing can be easily carried in a pocket. A radiation sensor assembly 16 is positioned at one end of the housing 14.

Figure 1:
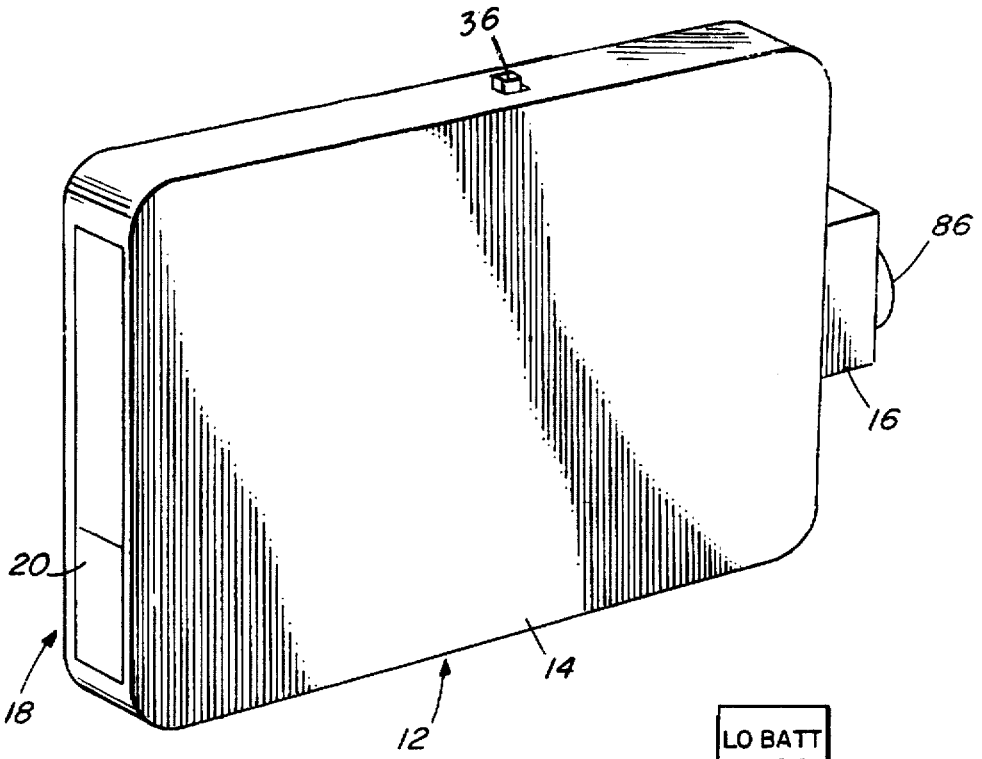
FIG. 1 is a perspective view of a heat detector embodying this invention and having a multicolor bar graph display at an end of a housing opposite to a radiation sensor.
Figure 3:
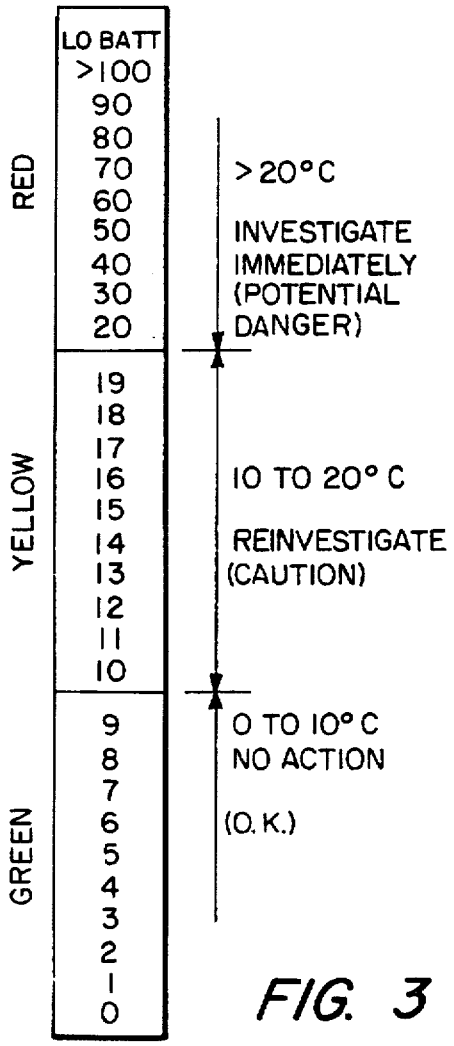
FIG. 3 is an enlarged illustration of the scale of the multicolor bar graph of FIG. 1 with the guidelines recommended by insurance and utility companies.

An LED bar graph display 18 is located at the end of the housing 14 opposite to the sensor assembly 16. This particular bar graph includes the scale from 0 degree centigrade to 100 degree centigrade. As shown in FIG. 3, a 0 degree to 20 degree part of the scale is divided into 1 degree increments. The 20 degree to 100 degree part of the scale is divided into 10 degree increments. The 0 degree to 9 degree segment is colored green indicating no need for corrective action according to the guidelines recommended by insurance and utility companies. The 10 degree to 19 degree segment is colored yellow indicating a need to reinvestigate. The 20 degree to 100 degree segment is colored red indicating a need to investigate immediately. These inspection guidelines are detailed on one side of the housing 14. The region 20 in FIG. 1 is illuminated from 0 degree centigrade to the indicated temperature providing a full bar indication of radiation detected by the sensor assembly 16 relative to an ambient reference established by an autozero circuit to be described. The segment colored red flashes on and off for detected temperature rise above 100 degrees centigrade.

In another embodiment of the invention, the bar graph does not include a numerical scale. Instead the bar graph includes the three segments colored green, yellow and red, respectively indicating the corrective action recommended by the insurance and utility company guidelines. Further in another design of the invention the display includes the three colored segments but is not illuminated to give a full bar indication rather just a single level indication is displayed. In another design of the invention, the display has two segments colored red in addition to a green and yellow segment. The first red segment displays temperatures between about 20 degrees centigrade and 65 degrees centigrade. The second red segment displays temperatures above about 65 degrees centigrade.

In another design of the invention a pulsed audible signal sounds at a different pulse frequency for each colored segment of the bar graph display. The pulse frequency increases as the detected temperature rise increases. A switch to disenable the audible signal is also available in another design of the invention.

Figure 2:
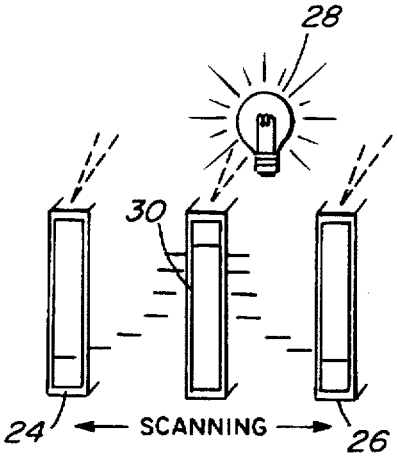
FIG. 2 is a schematic illustration of use of the detector of FIG. 1 to scan a radiation source.

FIG. 2 illustrates an example of the use of the device to scan a region to pinpoint a source of maximum radiation. While directed to a neutral surface as in position 24, the indication 20 is set at a low region of the scale. The indication 20 is automatically zeroed at this level and the radiation sensor is then scanned across a wide field to a position 26. Within that field, the sensor senses radiation from the light source 28. As indicated by the scale position shown schematically between the two end positions 24 and 26, the indication 20 rises to a maximum level at the position 30 at which the sensor is directed at the light source 28. Having been automatically zeroed at the ambient temperature, the indication 20 provides a reading of the temperature rise above ambient. The maximum reading is the measurement of interest and such reading is much more readily picked up by an observer using a bar graph display than a digital numerical display.

Figure 4:
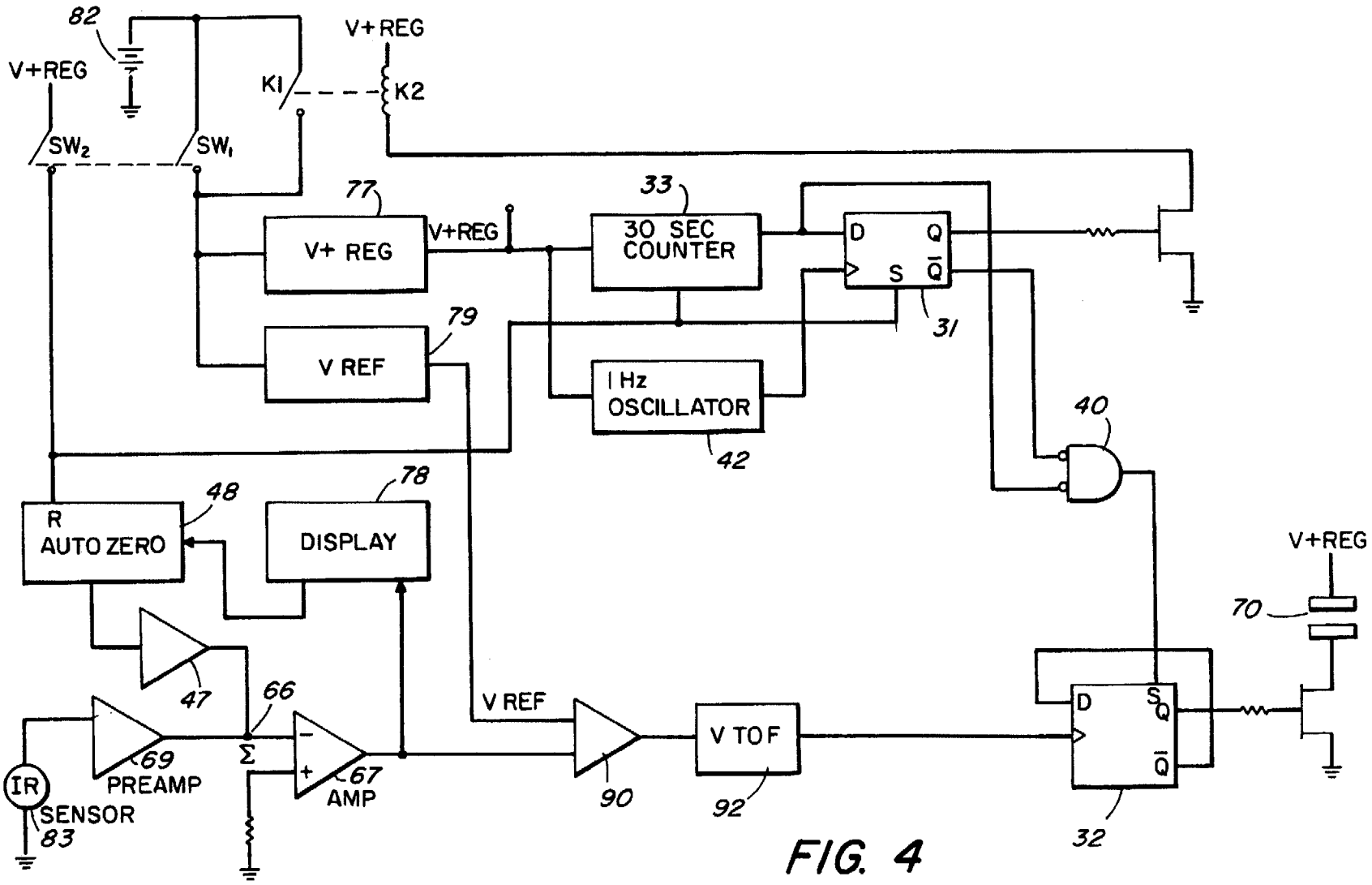
FIG. 4 is an electrical schematic diagram of the electrical circuit used in an embodiment of the invention having a timing circuit.

The electrical schematic diagram of the electrical circuit used in one embodiment of the invention is illustrated in FIG. 4. The unit is self operated for a predetermined length of time after the initial powering of the unit by way of a timing circuit which includes a 30 second counter 33. In this embodiment the initial powering of the unit begins by the user squeezing the side of the housing 14 of FIG. 1. Upon squeezing, the housing power is applied from the battery 82 through the switch $SW_1$ of FIG. 4 to the V+ regulated line which begins the counter 33. The switch $SW_1$ is manually held closed by the user long enough for the high voltage across the V+ regulated line to close switch K1 through coil K2 connected to switch K1. [Switch] *After the switch SW1 opens, switch* K1 maintains connection of the 9 V Battery 82 to lines (*not shown*) powering the rest of the circuit. Switch $SW_2$ is connected to switch $SW_1$ and thereby is closed at the same time. The closing of switch $SW_2$ resets [and powers up] the autozero circuit 48, and sets D flip flop 31.

The autozero circuit 48, as will be described later, produces a negative reference signal which is applied through a buffer 47 to the summing node 66 where it is summed with a subsequent negative radiation signal from IR sensor 83. This summed voltage is amplified in amplifier 67. The output voltage from amplifier 67 triggers the display 78 to provide an indication of the sensed radiation.

The output voltage from amplifier 67 also controls the voltage to frequency device 92 which controls the pulse frequency of buzzer 70. The output voltage is offset at comparator 90 to produce the lowest duty cycle of the voltage of frequency device 92 at ambient. The output voltage form amplifier 67 causes the voltage to frequency device 92 to pulse the clock of the D flip flop 32. Each time the clock is pulsed, the D flip flop 32 produces output Q directly from input D. Output $\overline{Q}$ leads into the D input of D flip flop 32 so that after each pulsing of the clock a change in $\overline{Q}$ will result in a subsequent change in the D input so that on the next clock pulse a change in Q will occur. Thus D flip flop 32 ensures a 50% duty cycle of the buzzer 70 and the frequency of the D flip flop 32 is generated by the voltage to frequency device 92.

As the temperature sensed by the sensor 83 increases so does the output voltage from amplifier 67. In turn, the increased output voltage from amplifier 67 causes the voltage to frequency device 92 to produce a more frequent clocking signal to D flip flop 32 which causes an increase in the pulsing frequency of buzzer 70. Because the display is also triggered by the output voltage from amplifier 67, the increasing pulse frequencies of buzzer 70 correspond to the increasing display indication.

[The buzzer 70 is refrained from sounding upon initial powering of the device by the gate 40. During this time,] *Gate 40 causes the buzzer 70 to sound for one second as the unit shuts itself off. Upon initial powering of the device, flipflop 31 is set such that its $\overline{Q}$ output goes low, and the 30-second counter 33 is set such that its output is high. Through the next 30 seconds*, the gate 40 has a high voltage input from the output of the 30 second counter 33 and a low voltage second input from the $\overline{Q}$ output of the D Flip Flop 31. These two inputs produce a low voltage output from the gate 40 which disables the *set input* D flip flop 32. [thus holding the buzzer 70 from sounding] *so that the buzzer is only sounded with clocking of the flipflop 32 by the voltage-to-frequency converter 92.*

After counter 33 counts the 30 seconds during which the unit has been operating the voltage output of counter 33 drops, causing the formerly high input to the gate 40 to become a low voltage input. Because the other input to gate 40 from the $\overline{Q}$ output of D flip flop 31 is also low, the output of gate 40 becomes a high voltage output and thus [enables] *sets* the D Flip Flop 32. The buzzer 70 is thereby sounded [upon the next clocking of D flip flop 32 from the voltage output of the voltage to frequency device 92]. The $\overline{Q}$ output from D Flip Flop 31 is delayed from changing voltages a second time (low to high) by the 1 Hz oscillator 42. After 1 second, D Flip flop 31 is clocked by the 1 Hz oscillator and the $\overline{Q}$ output from D Flip Flop 31 changes from a low to a high voltage, thus causing dissimilar inputs to the gate 40 and disabling *the set input to* the D Flip Flop 32 [from further sounding the buzzer 70]. Thus just before the unit shuts itself off the buzzer sounds one last time.

The drop in voltage of the voltage output of counter 33 not only sounds the buzzer 70 but also changes the Q output of D flip flop 31 from high to low. This low voltage causes coil K2 to open switch K1 and thereby shuts off the unit. A subsequent squeeze of the housing 14 resets the autozero reference signal held in buffer 47 and the 30 second counter 33 in the same manner as described above for initial powering of the device.

Display 78 operates as follows. The signal from the thermopile sensor element 83 is amplified in a preamplifier 69. At the summing node 66, the radiation signal from the thermopile is summed with the reference signal from the autozero circuit to be described. The sum is amplified in an amplifier 67. Each display driver in display 78 responds to the amplified signal and incrementally selects light emitting diodes to light the bar graph display.

Each display driver incrementally selects light emitting diodes based on the high and low reference inputs for that particular driver. The incremental change of each driver is defined at a voltage of one-tenth of the difference between the high and the lows references, there being ten light emitting diodes per driver. The light emitting diodes associated with each driver are linearly driven by that driver. The low reference of the succeeding driver is set equal to the high reference to the preceding driver. The voltage per incremental change of the succeeding driver is then defined by its high and low references which have a different difference than the high and low references of the preceding driver. The light emitting diodes selected from one display driver to the next are thus driven in a piece-wise linear fashion. This results in each driver responding to a single incremental change in the amplified signal for different selections of light emitting diodes, but different drivers responding to different incremental changes for different selections of light emitting diodes. The display drivers provide a piece-wise linear approximation of temperature which is a nonlinear function of the sensed heat flux.

In the particular embodiment, the display driver associated with the light emitting diodes for the zero degree to 9 degree end of the bar graph has a low reference to zero mV and a high reference voltage of 150 mV. A display driver selects each additional LED in response to a voltage step of 15 mV to indicate a temperature change of 1 degree on the bar graph. The low reference input to the succeeding driver is 150 mV and the high reference is 320 mV to establish a voltage step of 17 mV for each degree of change on the bar graph between the 9 degree and 19 degree segment.

The third display driver uses references which account for both the linearization and the change in scale increment in the 20 degree to 100 degree centigrade part of the bar graph. The first incremental change at which the third driver responds provides the 1 degree centigrade change in temperature on the bar graph from 19 degree centigrade to 20 degrees. The remaining incremental change with the third driver provide selection of the LEDs for the 10 degree increments in the 20 degree to 100 degree segment of the bar graph. A complication arises with the third driver because it must provide a 1 degree increment from 19 degrees to 20 degrees and 10 degree increments thereafter. To accomplish this, the low reference is set at a level below 320 mV, the high reference of the preceding driver, and the high reference is set at 2.4 volts. The third driver, therefore, responds to approximately 320 mV increments. The large incremental change to which the driver responds sets the first trigger level at about (0.106+0.230) or at 0.336 mV. This is approximately the input to which the second driver would have responded if it had one more stage responding to 17 mV increments. Beyond the 0.336 mV, the driver increments the display at 230 mV increments. Those increments account for the third piece of the piece-wise linear approximately of temperature with ten degree increments.

As previously stated, at the beginning of each scan illustrated in FIG. 2, the display is automatically zeroed at the ambient temperature of the neutral surface at which the device is first pointed, using an autozero circuit as commonly known in the art. Referring to FIG. 4, power is applied from the battery 82 through switch K1 to the entire circuit. The transition to a high potential results in a positive pulse at an opposite side of a capacitor in autozero circuit 48 which triggers a comparator. A negative pulse results at the output of the comparator to draw current through a diode and a resistor and place a negative charge on a reference capacitor. That negative potential is applied through a buffer 47 to the summing node 66 where it is summed with the negative radiation signal. The charge initially placed on the reference capacitor establishes a high negative reference signal which results in the display 78 being set well above the zero degree centigrade level of the bar graph. The high reference signal is then reduced by bleeding the charge from the reference capacitor until the display 78 reachbes the zero level of the bar graph. The reference signal is reduced at a decreasing rate as the display 78 approaches the zero level of the bar graph. This is accomplished by tapping the input to the LED at the 10 degree level of the bar graph so that when the display 78 reaches this level, a D flip-flop opens one switch reducing the rate at which charge is bled off from the reference capacitor. Likewise, input to the LED at the zero degree level of the bar graph is tapped to provide an indication of the display 78 approaching the zero degree level. A second D flip-flop is then triggered and a second switch stops the bleeding of charge from the reference capacitor. The amount of charge of the reduced reference signal is inversely related to the radiation sensed from the ambient surface and is reproduced at the output of buffer 47 to be added to each signal from the radiation sensor 83 throughout the scan. The display 78 is thus autozeroed and provides readings of the temperature rise above ambient.

Figure 5:
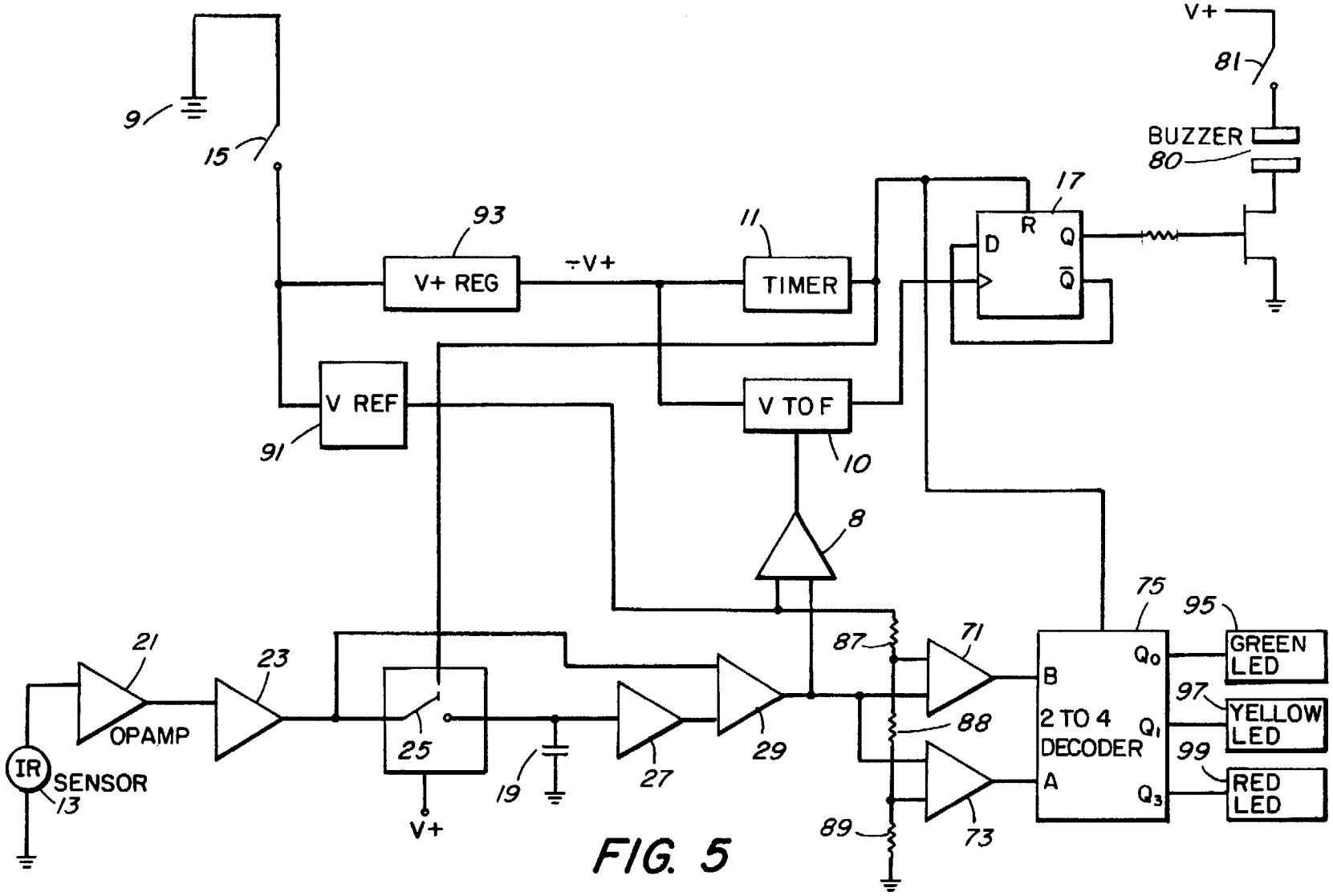
FIG. 5 is an electrical schematic diagram of the low cost electrical circuit of another embodiment of the invention.

Shown in FIG. 5 is another embodiment of the invention with a different autozero circuit than in the embodiment of FIG. 4 and which is designed for the minimization of production costs. The autozero circuit of the embodiment in FIG. 5 may also be used in the embodiment of FIG. 4. In FIG. 5, an autozero reference signal is established by the user closing switch 15 which is the power switch connecting the 9 v battery 9 to the V+ and other lines of the circuit. The radiation sensor 13 detects the radiation of the object at which the device is initially pointing. Provided that the initial object is at a temperature above ambient, the sensed radiation produces a negative voltage which is applied through the dual operational amplifiers 21 and 23 to produce a gain in voltage.

Switch 25 is closed by timer 11 when the device is turned on. Switch 25 allows the negative voltage to charge the capacitor 19 to a level indicative of the temperature of the object toward which the device initially points. Timer 11 holds switch 25 closed about 500 msec which is long enough for the capacitor 19 to be charged by the initial negative voltage from the radiation sensor 13. At the end of the 500 msec, the timer opens switch 25 to discontinue the charging of the capacitor 19. The initial high voltage output of the timer 11 also holds the buzzer 80 off and disables the display decoder 75 while the capacitor 19 is being charged. After the allotted time, the timer output voltage drops to reset the buzzer 80 and enable the 2 to 4 decoder 75. The enablement of the decoder causes the green LED to light, thus signifying that the unit has been autozeroed.

The negative charge held by the capacitor 19 is applied to a buffer 27. The negative voltage output of buffer 27 is the autozero reference signal which is later input to differential amplifier 29 with subsequent radiation signals from amplifier 23 indicative of temperatures sensed by sensor 13. The output voltage from amplifier 29 is a positive voltage indicative of the difference between the reference temperature and the temperature being observed. The voltage drives comparators 71 and 73 to produce inputs at 'A' and 'B' of the 2 to 4 decoder 75. The second inputs to the comparators are taken from a voltage divider of resistors 87, 88 and 89 which divides the reference voltage from the reference voltage generator 91. With low temperatures the output voltage from differential amplifier 29 is less than that across resistor 89 and neither comparator is enabled. With somewhat higher temperatures the output voltage surpasses that across resistor 89 and comparator 73 is enabled. With yet higher temperatures the voltage across resistors 87 and 89 is matched and comparator 71 is enabled. The decoder 75 selects one of three outputs placing a high voltage on one of three display LED's connected to the decoder outputs. If the voltage differential is below about 166 mv then comparators 71 and 73 produce low outputs to the decoder inputs 'A' and 'B' producing a high voltage output of the decoder 75 at $Q_0$ which illuminates just the green LED. 166 mv is the amount of voltage that would result from detecting a 10 degree centigrade rise in target temperature above ambient. If the differential is between about 167 mv and 316 mv, then comparator 73 places a high voltage input at 'A' and comparator 71 places a low voltage at input 'B'. Those inputs are decoded to produce a high voltage output at $Q_1$ to illuminate just the yellow LED. The green LED is dimmed at output $Q_0$ is now low. 317 mv is the amount of voltage indicative of a 20 degree centigrade change in sensed temperature. If the differential voltage is above about 317 mv then there are high inputs to decoder 75 at both 'A' and 'B', producing a high output at $Q_3$ which illuminates just the red LED and low outputs at $Q_0$ and $Q_1$ which dim the green and yellow LED's.

The output voltage from amplifier 29 also controls the voltage to frequency device 10. This voltage is offset by the reference voltage, preferably about 2.5 v to 3.4 v from VREF91 at comparator 8 to produce the lowest duty cycle of the voltage to frequency node 10 at ambient. The output voltage from amplifier 29 causes the voltage to frequency node 10 to pulse the clock of the D flip flop 17. Each time the clock is pulsed, the D flip flop 17 has an output Q directly dependent upon input D. The output $\overline{Q}$ is connected to the D input so that after each pulsing of the clock a change in $\overline{Q}$ will result in a subsequent change in D which in turn produces a change in Q on the next pulse of the clock. Thus the D flip flop 17 ensures a 50% duty cycle of the buzzer 80 and the frequency of the D flip flop 17 is generated by the voltage to frequency device 10. In turn, as the output voltage from amplifier 29 increases, the voltage to frequency device 10 produces a more frequent clocking signal to D flip flop 17 which causes an increase in the pulsing frequency of buzzer 80. Also, as the temperature sensed by the sensor 13 increases, the output voltage from amplifier 29 increases to produce an increase in pulse frequency of the buzzer 80. The increasing pulse frequencies of the buzzer 80 correspond to the green, yellow and red LED's respectively. A slow continuous pulse frequency sounds for the temperatures sensed in the range of temperatures illuminating the green LED. The pulse frequency increases for increasing temperatures within the green LED range and continues to increase through the yellow and red LED temperature range. The fastest pulse frequencies sound when sensed temperatures are in the temperature range for which the red LED is illuminated, the voltage to frequency device 10 reaching a limit and causing the buzzer 80 to emit a constant tone for sensed temperatures above about 20 degrees. By pressing switch 81, the user can disable the buzzer 80 for situations where the audible signal is not wanted.

Figure 6:
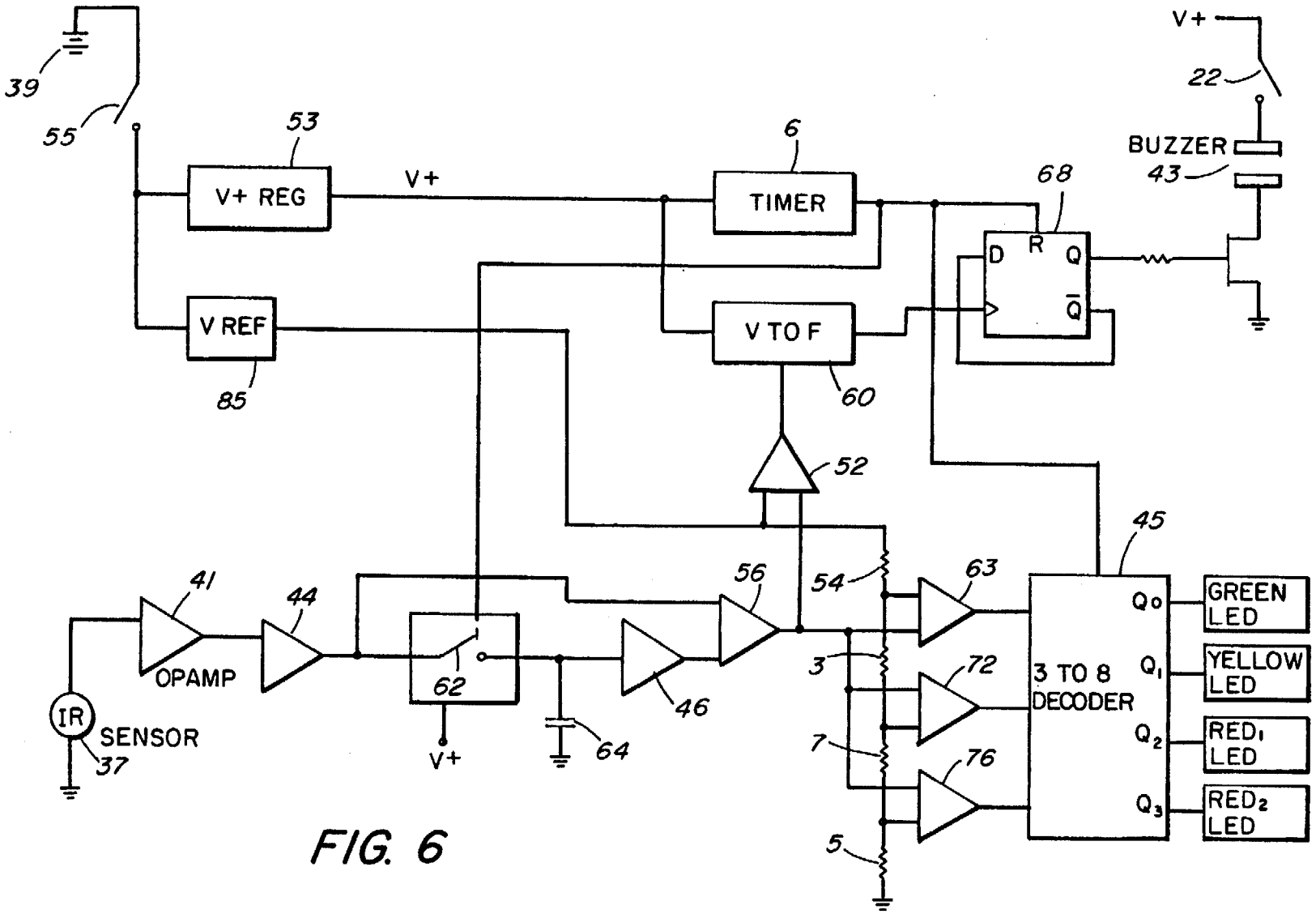
FIG. 6 is an electrical schematic diagram of the electrical circuit used in an embodiment of the invention having a four LED display.

In an alternative embodiment, a four LED display is driven by three comparators and a 3 to 8 decoder as shown in FIG. 6. The rest of the electrical circuit is the same as in the embodiment of FIG. 5. The four LED's of the display are colored green, yellow, red, and a second red respectively. One LED at a time is illuminated. The green LED signifies a temperature rise above ambient of up to about 10 degrees centigrade. The yellow is illuminated for a sensed temperature rise between about 10 and 20 degrees centigrade. The first red LED is illuminated for sensed temperature rise between about 20 and 65 degrees centigrade. The second red LED is illuminated for sensed temperature rise above about 65 degrees centigrade.

Power switch 55 is closed by the user upon operation of the device. Power switch 55 connects battery 39 to the lines of the circuit. Timer 6 is in turn powered and closes switch 62 for about 0.5 seconds. During this interval, the negative voltage produced by the IR sensor corresponds to the ambient object at which the device is pointing. This voltage is amplified by amplifiers 41 and 44, and stored on capacitor 64. The timer 6 also holds buzzer 43 off and disables the decoder 45 powering the display until the capacitor 64 is charged. At the end of the 0.5 seconds, the timer 6 opens switch 62 to discontinue the charging of capacitor 64, reset the buzzer 43, and enables the decoder 45 allowing the greed LED to light signifying that the device is autozeroed.

The negative charge held by capacitor 64 is applied to buffer 46. The negative voltage output of buffer 46 is the autozero reference signal which is later input to differential amplifier 56 with radiation signals from amplifier 44 indicative of temperatures sensed by sensor 37. For targets emitting more energy than the autozero reference target amplifier 56 has a positive output, and for targets emitting less energy than the autozero target amplifier 56 has a negative output. The output is about 7.39 mv/btu/hr/sq ft sensed above or below the autozero target. That is, the output voltage from amplifier 56 is a voltage indicative of the difference between the reference temperature and the temperature being observed. The voltage drives comparators 63, 72, and 76 to produce inputs to a 3 to 8 decoder 45. The second inputs to the comparators are taken from a voltage divider of resistors 54, 3, 7 and 5 which divides the 2.53 V reference voltage from reference voltage generator 85 into voltages corresponding to the sensed change in radiation with the change in temperatures of the display. With a low sensed change in radiation, the output voltage from amplifier 56 is less than that across resistor 5 and none of the three comparators are enabled. The decoder 45 in turn illuminates only the green LED. With a somewhat higher change in sensed radiation, the output voltage surpasses that across resistor 5, and comparator 76 is enabled. Comparator 76 then places a high input to decoder 45 which causes the decoder to illuminate the yellow LED and dim the green LED. With a higher change in sensed radiation the voltage across resistors 3 and 7 is matched and comparator 72 is enabled. Comparator 72 in turn places a high input to decoder 45 which causes the first red LED to be illuminated and the yellow LED to be dimmed. With yet a higher change in sensed radiation, the voltage across resistors 54 and 3 is matched and comparator 63 is enabled. Comparator 63 places a high input to decoder 45 which in turn selects to illuminate just the second red LED.

The output voltage from amplifier 56 also controls the voltage to frequency device 60 which pulses the clock of D flip flop 68 sounding buzzer 43 in a manner similar to that described in the circuit of FIG. 5. The output voltage is offset by the reference voltage from reference voltage generator 85 at comparator 52 so that the voltage to frequency device 60 is at its lowest frequency at ambient and at its highest frequency when near the 20 degree centigrade sensed change in radiation threshhold. Once this threshhold is crossed the buzzer 43 will sound continuously. The buzzer sounds with increasing pulse frequency corresponding to the green, yellow, and two red LED's respectively in the same manner as the buzzer 80 in the embodiment of FIG. 5. The buzzer 43 can be disabled by the user pressing switch 22 for applications where the audible signal is not wanted.

Wavelengths are shorter from hotter sources of radiation. The device must detect wavelengths which are short relative to those from bodies at ambient temperature. On the other hand, the radiation from the very hot sun is of very short wavelengths and sunlight should not be detected. Relative to the radiation from the sun, overheated electrical connectors have relatively long wavelengths which can be readily distinguished with a wide range of filters. A further consideration, however, is that a user is likely to want to assure proper operation of a device by viewing a known hot source such as a match or light bulb. Such sources produce radiation of wavelengths much closer to those of sunlight and require much more specific filtering to allow for their detection to the exclusion of sunlight.

To ensure accurate infrared detection out of doors, a window 86 made of germanium covers the radiation sensor within the radiation sensor assembly 16 of FIG. 1. A lens comprising germanium is also suitable. The germanium window 86 or lens acts as a filter allowing only energy of certain wavelengths to be detected by the radiation sensor. The germanium glass filters out short wavelengths of less than about 1.7 microns from detection by the radiation sensor. 90% of the wavelengths in sunlight are less than 1.5 microns. Although the wavelengths of energy from hot electrical connectors are significantly greater than 1.5 microns, it is desirable to detect shorter wavelengths resulting from the flame of a match to assure proper operation of the unit. The flames of interest are on the order of about 2000° F. to 2500° F. and produce wavelengths of about 1.7 to 3 microns with a peak at about 2 microns. Thus the germanium glass filters out about 90% of the sunlight energy and only rejects about 10% of the energy of a flame.

The germanium window 86 serves a further purpose of preventing sunlight from burning out the sensor. Because the wavelengths of sunlight and other visible light are short, less than about 1.5 microns, it takes a very short time of exposure to such light to over expose and thus burn out the sensor. Hence, by the germanium window 86 filtering out the short wavelengths of sunlight and other visible light, the sensor is safeguarded against over exposure and subsequent burn out.

In the past, coated germanium windows were used as long wave pass filters. Coated germanium starts passing wavelengths at about 7 to 8 microns. Thus a coated germanium window would not allow detection of the shorter wavelengths of a flame test. Consequently, applicant uses uncoated germanium glass for window 86.

In contrast, ordinary glass filters out wavelengths [less] *greater* than about 3 microns. [Ordinary glass rejects about 30–40% of the wavelengths of a flame. Other glass filters, however, are suitable and may be used in place of window 86.] In general, it is best to have a *long wave pass* filter and sensor which provides a threshold between about 1.5 and 3.0 microns.

Another problem with the outdoor use of past detectors is the glare from sunlight causing difficulties in reading the detector display. In the present invention, this problem is overcome by the audio indication of the detected temperature rise above ambient. A continuous, slow pulsing 'beep' tone indicates that a minimal temperature above ambient is being detected. 'Beeps' at a faster pulse frequency indicate that a greater temperature is being detected. The user is made aware of a detected dangerous level of temperature rise by a 'beep' signal sounding at a pulse frequency faster than the other two mentioned frequencies. Thus, the use of the detector is not dependent on a light display which is often difficult to read in sunlight. This feature of an audible indication of the detected temperature is discussed and described above.

Further, the audible indication provides a means to alert the user of a temperature rise while scanning a subject. Once the user is alerted by an increase in pulse frequency, a quantitative analysis of the sensed temperature rise may be obtained by the display. Hence, the user can scan a subject without specifically knowing where to look for potential heat problems, locate the problem area with the audible signal, and now knowing where to focus the detector quantify the detected radiation with the display.

While this invention has been particularly shown and described with references to preferred embodiments thereof it will be understood by those skilled in the art that various changes in form and details may be made therein without departing from the spirit and scope of the invention as defined by the appended claims.

We claim:

1. A radiation detector comprising:

a radiation sensor;

a display assembly means responsive to a reference temperature signal and [sinals] *signals* indicative of radiation levels detected by the sensor for providing on a display an indication of the temperature of a subject above a reference temperature; and a timing circuit means which maintains the detector in operation for a predetermined length of time and thereafter automatically shuts off the detector, said reference temperature signal being reset when the detector is turned on subsequent to its automatically shutting off, said timing circuit means comprising:

a counter;

a power switch by which a user initially connects a battery to said counter and means for establishing the reference temperature signal;

an internal switch which is closed after the battery is connected to said counter and means for establishing the reference temperature signal, said internal switch closed maintaining the connection of the battery to circuits of the detector thereby allowing a user to release the power switch and the detector to maintain itself in operation, state of said internal switch being dependent on an output signal from said timing circuit means; and means for producing an audible signal dependent on a control signal from said counter and a second output signal from said timing circuit means, said audible signal sounding when said counter reaches a predetermined count and, said timing circuit means thereafter turns off the detector by opening the internal switch.

2. A radiation detector as claimed in claim 1 wherein said display is arranged in segments of different colors.

3. A radiation detector as claimed in claim 2 wherein the colors of said segments are green, yellow and red, respectively.

4. A radiation detector as claimed in claim 1 wherein said display has segments arranged to indicate temperature from about zero degrees centigrade to about 9 degrees centigrade, about 10 degrees to about 19 degrees centigrade, and about 20 degrees centigrade and greater, respectively.

5. A radiation detector as claimed in claim 1 wherein, the means for producing an audible signal includes means producing an audible signal having a pulse frequency that increases in correspondence with each temperature increase detected by the sensor and indicated in the display, the means being associated with the signals indicative of detected radiation.

6. A radiation detector as claimed in claim 1 further comprising an autozero circuit which establishes the reference temperature signal which is summed with said signal indicative of detected radiation to produce a display signal, the autozero circuit comprising means for establishing the reference temperature signal indicative of ambient temperature and means for holding the reference signal, the display assembly means being responsive to the display signal.

7. A radiation detector as claimed in claim 6 wherein said reference temperature signal is established by placing a voltage on a capacitor.

8. A radiation detector as claimed in claim 1 further comprising a window, the window covering said sensor to filter out short wavelengths on the order of less than about 1.5 microns while allowing longer wavelengths of about 1.5 to 3 microns and greater to be detected by said sensor.

9. A radiation detector as claimed in claim 8 wherein the window comprises germanium.

10. A radiation detector comprising:

a radiation sensor providing a radiation signal indicative of sensed radiation;

an autozero circuit which establishes a reference signal which is summed by summing means with the radiation signal from the radiation sensor to provide a display signal;

a display assembly responsive to the display signal and having a multicolor display for providing a visual indication of the amount of radiation sensed by the radiation sensor, the display arranged in segments of different colors;

a sound generator means for generating an audible signal with differing pulse frequencies, each pulse frequency corresponding to an amount of radiation indicated by the display such that the pulse frequency increases for increasing amount of radiation indicated on the display means for filtering out short wavelengths on the order of less than about 1.5 microns while allowing longer wavelengths above about 1.5 microns generated by sources of interest to be sensed by the sensor; and a timing circuit initialized when power is applied to the detector and which maintains power supply to circuits of the detector for a predetermined length of time through control of an internal power switch means and thereafter automatically shuts off the detector by applying a control signal to the internal power switch means and a signal to actuate the sound generator means prior to shut-off of the detector, said reference signal being reset when the detector is turned on subsequent to its automatically shutting off.

11. A radiation detector comprising:

a radiation sensor;

a display assembly means for providing on a segmented illuminatable display [in] *an* indication of the amount of radiation sensed by the radiation sensor above a reference amount of radiation;

an autozero circuit comprising time controlled means for *placing a voltage on a capacitor for* establishing a reference signal indicative of a reference amount of radiation detected by the radiation [sensor; and] *sensor from a reference target;*

*means for summing* the reference signal [being summed] with a radiation signal indicative of the amount of sensed radiation subsequently detected by the radiation sensor to provide a display signal, the display assembly *means* being responsive to the display signal and thereby providing on the display an indication of the amount of [a] radiation sensed above the reference amount of radiation; *and* timing means for controlling the time controlled means.

[12. A radiation detector as claimed in claim 11 wherein said time controlled means for establishing a reference signal includes placing a voltage on a capacitor, the voltage being produced by the radiation sensor initially detecting a reference target.]

13. A radiation detector as claimed in claim [11] *12* wherein said [means for controlling said time controlled means comprise] *timing means comprises* a timer coupled to [a switch] *the time controlled means* which enables *a* reference signal voltage to be placed on the capacitor for a certain amount of time after initial detection of an ambient target and thereafter disables the placing of said reference signal voltage on the capacitor, after the certain amount of time the timer providing an output voltage drop which enables the display assembly means to illuminate one segment of the display signifying to a user that the detector has been autozeroed.

14. A radiation detector as claimed in claim 13 further comprising means for producing an audible signal which corresponds to the amount of radiation sensed by the sensor [and] *above an ambient level which is* indicated on the display, a pulse frequency of the audible signal increasing for each increase in amount of sensed radiation indicated by the display, [where] *wherein* the timer disables the audible signal producing means [from] *to inhibit the* sounding *of* the audible signal during the time in which reference signal voltage is placed on the capacitor and enables the audible signal producing means to sound the audible signal thereafter when the display in illuminated.

15. A radiation detector as claimed in claim 14 wherein the means for producing an audible signal includes a buzzer which is disabled and enabled by a switch controlled by the user.

16. A radiation detector as claimed in claim 11 further comprising:

means for producing an audible signal having a pulse frequency that increases for each increase in amount of sensed radiation indicated by the display[. the]; *and* means for [producing] *disabling production of* the audible signal [being disabled by said timing means] during the time in which the reference signal is established, and [enabled thereafter] *for enabling production of the audible signal after the reference signal is established.*

17. A radiation detector as claimed in claim 16 wherein the means for producing an audible signal includes a buzzer which is enabled and disabled by a switch controlled by a user.

18. A radiation detector as claimed in claim 11 wherein the display includes:

a green LED for indicating the detection of an amount of radiation which has a corresponding temperature within a range of temperatures slightly above the temperature corresponding to the reference amount of radiation;

a yellow LED for indicating the detection of an amount of radiation which has a corresponding temperature within a range of temperatures higher above the temperature corresponding to the reference amount of radiation than the range of the green LED; and a first red LED for indicating the detection of an amount of radiation which has a corresponding temperature within a range of temperatures higher above the temperature corresponding to the reference amount of radiation than the range of the yellow LED, and wherein only one LED is illuminated at a time.

19. A radiation detector as claimed in claim 18 further comprising a second red LED for indicating the detection of an amount of radiation which has a corresponding temperature within a range of temperatures higher above the temperature corresponding to the reference amount of radiation than the range of the first red LED, and wherein the first red LED indicates a range of temperatures of about 20 degrees to 64 degrees centrigrade above the temperature corresponding to the reference amount of radiation and the second red LED indicates a range of temperatures of about 65 degrees centigrade and greater above the temperature corresponding to the reference amount of radiation.

20. A radiation detector as claimed in claim 11 further comprising a window, the window covering said sensor to filter out short wavelengths on the order of less than about 1.5 microns while allowing longer wavelengths of about 1.5 to 3 microns and greater to be detected by said sensor.

21. A radiation detector as claimed in claim 20 wherein the window comprises germanium.

22. A radiation detector comprising:

a radiation sensor;

an autozero circuit means which establishes a reference signal and subtracts it from a radiation signal indicative of sensed radiation to provide a display signal, the autozero circuit means comprising a time controlled switch which enables voltage being produced by the radiation sensor initially detecting a reference target at ambient temperature to be placed on a capacitor for a certain amount of time after initial detection of ambient temperature and thereafter disables the placing of voltage on the capacitor, the voltage charging the capacitor to a level indicative of detected ambient temperature such that the charged capacitor provides a reference signal corresponding to *the* ambient temperature;

a selectively actuated display assembly having a display of different colored LED's, the assembly being responsive to the display signal to drive the display to provide an indication of the amount of radiation sensed by the radiation sensor as a difference between the reference signal and the radiation signal *and to be* indicative of the sensed radiation, one LED of the display being initially illuminated when the time controlled switch disables the placing of voltage on the capacitor signifying to a user that the detector has been autozeroed;

a means for controlling said time controlled switch and selectively actuating said display assembly, and a means for producing an audible signal;

said audible signal [corresponds] *corresponding* to each LED such that the pulse frequency of the audible signal increases for each temperature increase of sensed radiation indicated within each LED and continues to increase for each temperature increase of sensed radiation indicated from one LED to the next; and means for filtering out short wavelengths on the order of less than about 1.5 microns while allowing longer wavelengths generated by sources of interest to be sensed by the sensor.

23. A radiation detector as claimed in claim 22 wherein said means for producing an audible signal limits the pulse frequency such that the audible signal is at a constant tone for sensed temperature increase above 20 degrees centigrade.

24. A radiation detector as claimed in claim 22 wherein said display includes:

a green LED for indicating the detection of an amount of radiation which has a corresponding temperature within a range of temperatures slightly above the detected ambient temperature;

a yellow LED for indicating the detection of an amount of radiation which has a corresponding temperature within a range of temperatures higher above the detected ambient temperature than the range of the green LED; and a first red LED for indicating the detection of an amount of radiation which has a corresponding temperature within a range of temperatures higher above the detected ambient temperature than the range of the yellow LED, and wherein only one LED is illuminated at a time.

25. A radiation detector as claimed in claim 24 further comprising a second red LED for indicating the detection of an amount of radiation which has a corresponding temperature within a range of temperatures higher above the detected ambient temperature than the range of the first red LED.

26. A radiation detector comprising:

a radiation sensor;

a display assembly *means* associated with the sensor for providing on a display a temperature indication, relative to an ambient temperature, *of* the amount of radiation sensed by the radiation sensor, the display being accurate for radiation amounts corresponding to temperatures above the ambient temperature about 100° C. and lower;

means for filtering out short wavelengths on the order of less than about 1.5 microns while allowing longer wavelengths in a range about 1.5 to 3 microns and greater generated by sources of interest to be sensed by said sensor; and a housing for holding the sensor, display assembly *means*, display and means for filtering, the housing being of dimensions enabling hand held usage of the detector.

27. A radiation detector as claimed in claim 26 wherein said means for filtering is a window comprising germanium, the window covering said sensor.

28. A radiation sensor as claimed in claim 26 wherein said means for filtering out short wavelengths filters out wavelengths of reflected sun light and other visible light.

29. A method of sensing radiation, the steps comprising:

zeroing a radiation detector by detecting with the detector radiation indicative of an ambient temperature;

scanning a target area with the radiation detector, the detector having a display and an audible signal indicative of sensed temperature difference between a temperature corresponding to an amount of detected radiation during the scanning and the previously detected ambient temperature;

locating a subject within the target area by noting the subject at which the detector is pointing when the audible signal reaches a certain state; and providing a quantitative indication of temperature difference between the ambient temperature and temperature of the located subject using the display of the radiation detector.

30. A method as claimed in claim 29 further comprising the step of filtering out short wavelengths on the order of less than about 1.5 microns while allowing longer wavelengths of interest to be sensed by the radiation detector.

31. A method as claimed in claim 29 wherein the step of providing a quantitative indication includes providing a bar graph display of the temperature difference.

32. A radiation detector comprising:

a housing adapted to be hand held during use of the detector;

a radiation sensor positioned in the housing for sensing radiation received through one end of the housing;

a display assembly means having a display on the housing, the assembly means being responsive to the sensed radiation and driving the display to provide a temperature indication relative to the amount of radiation sensed by the radiation sensor; and filtering means for substantially filtering out wavelengths of energy generated from sunlight while passing wavelengths generated by sources of interest and for substantially allowing wavelengths of energy from a flame about 1100° to about 1370° C. to be sensed by the sensor such that a relative temperature indication thereof is provided on the display, the display only providing [accurate] temperature indications up to temperatures substantially less than that of the flame.

33. A radiation detector comprising:

a radiation sensor;

means for establishing a reference signal indicative of a reference temperature when the detector is turned on;

a display assembly means responsive to said reference signal and signals of the sensor indicative of sensed radiation for providing on a display an indication of the temperature of a subject above said reference temperature;

a timing circuit means which maintains the detector in operation for a predetermined length of time and thereafter automatically shuts off the detector and provides an actuating signal to a means for producing an audible signal, said reference temperature being reestablished when the detector is turned on subsequent to its automatically shutting off;

said means for producing an audible signal having a pulse frequency that increases in correspondence with each temperature increase detected by the sensor and indicated in the display, said audible signal further sounding just once before the automatic turning off of the detector in response to a signal from said timing circuit means.

[34. A radiation detector comprising:

a radiation sensor;

an autozero circuit means for establishing a reference signal indicative of a reference temperature when the detector is turned on a display assembly means responsive to signals indicative of radiation levels detected by the sensor for providing on a display an indication of the temperature of a subject above said reference temperature;

a timing circuit means which maintains the detector in operation for a predetermined length of time and thereafter automatically shuts off the detector, said reference signal being reestablished when the detector is turned on subsequent to its automatically shutting off; and said autozero circuit means establishes said reference signal and sums it with a radiation signal indicative of sensed radiation to produce a display signal the autozero circuit means further comprising means for holding the reference signal, said reference signal being reestablished by placing a voltage on a capacitor.]

*35. A radiation detector as claimed in claim 32 wherein said filtering means blocks wavelengths of about 1.5 microns and less.*

*36. A radiation detector as claimed in claim 32 further comprising sound generator means for producing an audible signal having a pulse frequency that increases in correspondence with increases in temperature detected by the sensor and indicated in the display.*

*37. A radiation detector as claimed in claim 32 wherein said display assembly means comprises a bar graph display comprising red, yellow, and green groups of light indicators, the light indicators representing incremental temperature differences.*

*38. A radiation detector as claimed in claim 32 wherein the display assembly means comprises a green LED for indicating temperature from about zero degrees centigrade to about 10 degrees centigrade, a yellow LED for indicating temperature from about 10 degrees centigrade to about 20 degrees centrigrade, and a first red LED for indicating temperature from about 20 degrees centigrade and greater and wherein only one LED is illuminated at a time.*

*39. A radiation detector as claimed in claim 38 wherein the first red LED indicates temperature from about 20 degrees centrigrade to about 65 degrees centigrade, the display assembly further comprising a second red LED for indicating temperature from about 65 degrees centigrade and greater.*

*40. A radiation detector as claimed in claim 32 wherein said detector is adapted to detect temperature variations of electrical equipment.*

*41. A radiation detector as claimed in claim 32 wherein the filtering means comprises a lens.*

*42. A method of sensing radiation, the steps comprising:*

*zeroing a radiation detector by detecting with the detector radiation indicative of an ambient temperature;*

*scanning a target area with the radiation detector, the detector having an audible signal a frequency of which is indicative of sensed temperature differences between a temperature corresponding to an amount of detected radiation during the scanning and the previously detected ambient temperature;*

*locating a subject within the target area by the frequency of the audible signal; and*

*providing a quantitative indication of temperature of the located subject using a display of the radiation detector.*

*43. A method as claimed in claim 42 further comprising the step of filtering out short wavelengths of less than about 1.5 microns while allowing longer wavelengths of interest to be sensed by the radiation detector.*

*44. A method as claimed in claim 42 wherein the step of providing a quantitative indication includes providing a display of the temperature with colors indicating different temperatures.*

*45. A method as claimed in claim 42 wherein the scanning step includes scanning a target area of electrical equipment with the radiation detector.*

*46. A radiation detector adapted for scanning a target area comprising:*

*a radiation sensor providing a radiation signal indicative of sensed radiation;*

*a display means for providing a quantitative indication of a sensed temperature difference;*

*a circuit means responsive to the radiation sensor for zeroing the radiation detector by establishing a reference signal indicative of an ambient temperature and for driving the display means to provide the quantitative indication of the sensed temperature difference between a temperature corresponding to an amount of sensed radiation during scanning of the target area, which is higher than the ambient temperature, and the reference signal indicative of the ambient temperature;*

*a sound generator means responsive to the radiation sensor and circuit means for generating an audible signal indicative of sensed temperature difference between a temperature corresponding to an amount of sensed radiation during scanning of the target area and the reference signal indicative of an ambient temperature.*

*47. A radiation detector as claimed in claim 46 wherein said display means comprises segments of different colors for providing a visual indication of sensed radiation relative to ambient temperature.*

*48. A radiation detector as claimed in claim 46 wherein the display means comprises a green LED for indicating temperature from about zero degrees centigrade to about 10 degrees centigrade above ambient temperature, and a first red LED for indicating temperature from about 20 degrees centigrade above ambient temperature and greater and wherein only one LED is illuminated at a time.*

*49. A radiation detector as claimed in claim 48 wherein the first red LED indicates temperature from about 20 degrees centigrade to about 65 degrees centigrade above*

*ambient temperature, the display assembly further comprising a second red LED for indicating temperature from about 65 degrees centigrade above ambient temperature and greater.*

*50. A radiation detector as claimed in claim 46 further comprising filtering means for substantially filtering out wavelengths of energy generated from sunlight while passing wavelengths generated by a flame at about 1100° C. to about 1370° C.*

*51. A radiation detector as claimed in claim 50 wherein said filtering means is a long wave pass filter which starts passing light at wavelengths in the range of about 1.5 microns to 3.0 microns.*

*52. A radiation detector comprises:*

*a radiation sensor providing a radiation signal indicative of sensed radiation;*

*an autozero circuit means which establishes a reference signal;*

*means for combining the reference signal with said radiation signal to provide a temperature difference signal;*

*sound generator means for producing an audible signal responsive to the temperature difference signal; and*

*a display assembly means responsive to the temperature difference signal and having a multicolor display for providing a visual indication of the temperature difference signal, wherein the display comprises a green LED for indicating temperature from about zero degrees centigrade to about 10 degrees centigrade, a yellow LED for indicating temperature from about 20 degrees centigrade to about 20 degrees centigrade, and a first red LED for indicating temperature from about 20 degrees centigrade and greater and wherein only one LED is illuminated at a time.*

*53. A radiation detector as claimed in claim 52 wherein the first red LED indicates temperature from about 20 degrees centigrade to about 65 degrees centigrade, the display assembly further comprising a second red LED for indicating temperature from about 65 degrees centigrade and greater.*

*54. A radiation detector as claimed in claim 52 wherein said detector is adapted to sense radiation from electrical equipment.*

*55. A radiation detector as claimed in claim 52 wherein the sound generator means produces an audible signal having a pulse frequency that increases in correspondence with increasing temperature detected by the sensor and indicated by the display.*

*56. A radiation detector as claimed in claim 52 further comprising means for housing the radiation detector, said housing means having an opening, the radiation sensor being positioned in the housing means to sense radiation passing through the opening, the housing being adapted to be hand held during use of the detector.*

*57. A radiation detector as claimed in claim 52 further comprising filtering means for substantially filtering out wavelengths of energy generated from sunlight while passing wavelengths generated by a flame at about 1100° C. to about 1370° C.*

*58. A radiation detector as claimed in claim 57 wherein said filtering means is a long wave pass filter which starts passing light at wavelengths in the range of about 1.5 microns to 3.0 microns.*

*59. A radiation detector as claimed in claim 57 comprising a lens through which radiation is received by the radiation sensor.*

*60. A radiation detector adapted for scanning of a target area comprising:*

*a housing adapted to be hand held during the use of a detector;*

*a radiation sensor positioned in the housing for sensing radiation received through one end of the housing and generating a radiation signal indicating levels of the radiation;*

*a circuit for generating a reference signal from the radiation signal indicative of ambient radiation levels;*

*a multicolor display means for providing a visual quantitative indication of a difference signal in green, yellow and red segments of an LED display;*

*a filtering means for substantially filtering out wavelengths of radiation energy generated from sunlight while passing wavelengths of radiation energy generated by sources of a flame at about 1100° to about 1370° C.;*

*sound generator means for producing an audible signal having a pulse frequency that increases with increasing radiation sensed by the radiation sensor and indicated by the display means; and*

*an amplifier for driving the multicolor display means and the sound generator means and for generating the difference signal in response to the reference signal and the radiation signal.*

*61. A radiation detector as claimed in claim 60 wherein said filtering means is a long wave pass filter which starts passing light at wavelengths in the range of about 1.5 microns and greater generated by sources of interest.*

*62. A radiation detector as claimed in claim 60 wherein the filtering means comprises a lens.*

*63. A radiation detector adapted for scanning of a target area comprising:*

*a housing adapted to be hand held during the use of a detector;*

*a radiation sensor positioned in the housing for sensing radiation received through one end of the housing;*

*a multicolor display means for providing a visual indication of the radiation sensed by the sensor in green, yellow and red segments of an LED display, the display means comprising a green LED for indicating temperature, corresponding to sensed radiation, from about zero degrees centigrade to about 10 degrees centigrade, a yellow LED for indicating temperature, corresponding to sensed radiation, from about 10 degrees centigrade to about 20 degrees centigrade, and a first red LED for indicating temperature, corresponding to sensed radiation, from about 20 degrees centigrade and greater, only one LED being illuminated at a time;*

*a driver for driving the multicolored display means in response to the sensor; and*

*a filtering means for substantially filtering out wavelengths of radiation energy generated from sunlight while passing wavelengths of radiation energy generated by sources of a flame at about 2000° to about 2500° F.*

*64. A radiation detector as claimed in claim 63 wherein the first red LED indicates temperature from about 20 degrees centigrade to about 65 degrees centigrade, the display means further comprising a second red LED for indicating temperature, corresponding to sensed radiation, from about 65 degrees centigrade and greater.*

*65. A radiation detector adapted for scanning of a target area of electrical equipment comprising:*

*a radiation sensor for sensing radiation during scanning of the target area;*

*a circuit for establishing a reference signal indicative of a reference amount of radiation detected by the radiation sensor;*

*means for providing an indication of the amount of radiation sensed by the sensor above the reference amount of radiation, the means for providing an indication comprising sound generator means for producing an audible signal having a pulse frequency that increases with increasing radiation detected by the radiation sensor; and*

*a filtering means for substantially filtering out wavelengths of radiation energy generated from sunlight while passing wavelengths of radiation energy generated by a flame at about 1100° C. to about 1370° C.*

*66. A radiation detector adapted for scanning of a target area of electrical equipment comprising:*

*a radiation sensor for sensing radiation during scanning of the target area and generating a radiation signal;*

*a circuit means for establishing a reference signal being indicative of a reference amount of radiation detected by the radiation sensor and comparing the reference signal to the radiation signal;*

*display means responsive to the circuit means for providing an indication of the amount of radiation sensed by the sensor above the reference amount of radiation for radiation corresponding to temperatures less then 100° C., the display means comprising segments colored green, yellow and red respectively, wherein only one segment is illuminated at a time; and*

*a filtering means for substantially filtering out wavelengths of radiation energy in sunlight from passing to the sensor while passing to the sensor wavelengths of radiation energy generate by a flame at about 1100° C. to about 1370° C.*

*67. A radiation detector as claimed in claim 66 wherein the means for providing an indication is a display which comprises a green LED for indicating temperature from about zero degrees centigrade to about 10 degrees centigrade, a yellow LED for indicating temperature from about 10 degrees centigrade to about 20 degrees centigrade, and a first red LE for indicating temperature from about 20 degrees centigrade and greater and wherein only one LED is illuminated at a time.*

*68. A radiation detector as claimed in claim 67 wherein the first red LED indicates temperature from about 20 degrees centigrade to about 65 degrees centigrade, the display assembly further comprising a second red LED for indicating temperature from about 65 degrees centigrade and greater.*

*69. A radiation detector comprising:*

*a housing adapted to be hand-held during use of the detector;*

*a radiation sensor positioned in the housing for sensing radiation from a target through one end of the housing and generating a sensor signal indicative of the sensed radiation;*

*an autozero circuits which establishes a reference signal indicative of an ambient temperature in response to the sensor signal received by the radiation sensor; and*

*an amplifier that drives a sound generator means responsive to the radiation sensor and the reference signal for producing an audible signal having a pulse frequency that increases with increase in temperature of the target.*

*70. A radiation detector comprising:*

*a radiation sensor generating a radiation signal indicative of sensed radiation;*

*an autozero circuit means responsive to the radiation sensor for automatically establishing a reference signal indicative of a reference temperature when the detector is turned on, said autozero circuit means summing said reference signal with said radiation signal to produce a display signal;*

*a display assembly means responsive to the display signal for providing on a display an indication of the temperature of a subject above said reference temperature; and*

*a timing circuit means which maintains the detector in operation for a predetermined length of time and thereafter automatically shuts off the detector, said reference signal being reestablished when the detector is turned on subsequent to its automatically shutting off.*

*71. A radiation detector comprising:*

*a radiation sensor;*

*means responsive to the sensor for generating a reference signal indicating radiation levels;*

*a bar graph display providing a visible temperature indication at temperatures substantially less than a flame;*

*an amplifier for driving the display in response to an amount of radiation sensed by the radiation sensor and the reference signal;*

*a filter attenuating short wavelengths on the order of less than about 1.5 microns while allowing longer wavelengths in a range above about 1.5 to 3 microns and greater generated by sources of interest to be sensed by the radiation sensor; and*

*a housing having an opening for enabling entrance of radiation, the filter being supported by the housing to filter the radiation and the sensor being supported by the housing to detect the radiation filtered by the filter, the display being supported by the housing to present its visible temperature indication, the housing being of dimensions enabling hand held usage of the detector.*

*72. A radiation detector as claimed in claim 71 wherein the filter attenuates wavelengths of reflected sunlight and other visible light.*

*73. A radiation detecting device, comprising:*

*a radiation sensor generating a detected radiation signal in response to received radiation;*

*a filter, in front of the radiation sensor, attenuating short wavelengths of radiation contained in sunlight and substantially passing wavelengths of radiation associated with a flame about 2000° to about 2500° F. and wavelengths of radiation associated with temperatures substantially less than the flame;*

*a bar graph display indicating temperatures substantially less than the flame; and*

*a circuit generating a comparison of the detected radiation signal and an ambient radiation signal representing an ambient level of radiation and driving the display in response to the comparison.*

*74. A radiation detecting device as claimed in claim 73, wherein the bar graph display comprises a multicolor bar graph for providing a visible indication of a temperature above an ambient temperature of a target at which the radiation sensor is directed.*

*75. A radiation detecting device as claimed in claim 73, wherein the filter blocks wavelengths of about 1.5 microns and less.*

*76. A radiation detecting device as claimed in claim 73, wherein the filter comprises a germanium lens.*

*77. A method for identifying electrical equipment operating temperature, the method comprising:*

*determining an ambient level of radiation with a radiation sensor;*

*scanning a target area comprising electrical equipment with the radiation sensor;*

*filtering radiation from the target area to the radiation sensor by attenuating short wavelengths of radiation of less than about 1.5 microns and substantially passing wavelengths between 1.7 and 3 microns and greater including wavelengths emitted by electrical equipment at less than 100° C.;*

*detecting the filtered radiation with the radiation sensor;*

*displaying a visible indication of operating temperature corresponding to an amount of the detected filtered radiation above a level corresponding to the ambient level of radiation.*

*78. A method as claimed in claim 77, wherein displaying the visible indication comprises driving a multicolor bar graph providing the visible indication in response to the detected radiation.*

*79. A method as claim in claim 77, further comprising identifying electrical equipment exhibiting an aberrant temperature in response to the detected radiation exceeding the level corresponding the ambient level of radiation by a predetermined amount.*

* * * * *